United States Patent Office 3,427,284
Patented Feb. 11, 1969

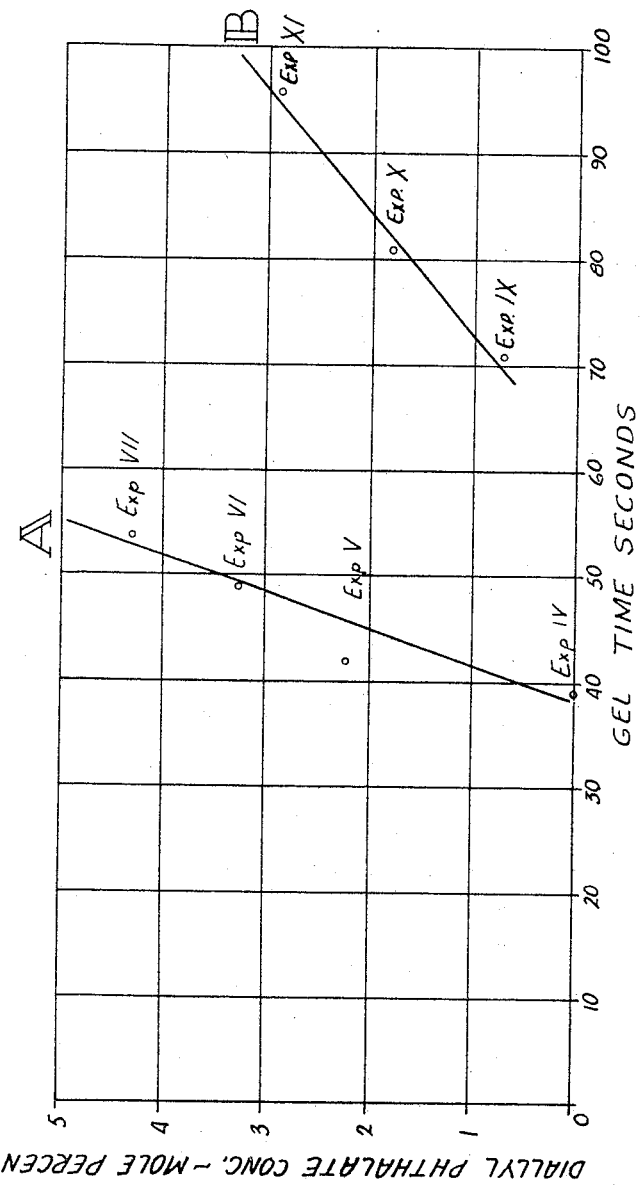

3,427,284
MANUFACTURE OF RESINOUS CONDENSATION PRODUCTS COMPRISING REACTING AN AMINE, PHENOL, OR UREA WITH FORMALDEHYDE IN THE PRESENCE OF AN ALLYLIC COMPOUND
Elvin M. Bright, 15940 Valley Vista Blvd., Encino, Calif. 91316; David R. Zachry, 5020 Hazeltine St., Sherman Oaks, Calif. 91403; and Joseph T. Cardone, 18348 Lahey St., Northridge, Calif. 91324
Continuation-in-part of application Ser. No. 249,039, Jan. 2, 1963. This application Oct. 17, 1966, Ser. No. 620,565
U.S. Cl. 260—57    9 Claims
Int. Cl. C08g 5/18

ABSTRACT OF THE DISCLOSURE

A process of making a condensation product by reacting an aldehyde such as formaldehyde with a compound from the classes of phenols, amines and ureas, for example, phenol. Prior to any condensation reaction between the aldehyde and the phenol, amine or urea, 0.1 to 15 mol percent, based on the percent of the phenol, amine or urea, of an allylic monomer which will not condense with the aldehyde and which is from the classes of allyl ethers, allyl esters of organic acids and allyl hydrocarbons, is added to the reactants. The aldehyde is then reacted with the phenol, amine or urea, in the presence of the allylic monomer.

---

This invention is concerned with a new and improved process for the manufacture of resinous condensation polymers and particularly with those condensation polymers classified as thermosetting resins. This application is a continuation-in-part of copending application Ser. No. 249,039, filed Jan. 2, 1963, now abandoned, and entitled Manufacture of Resinous Condensation Products.

It is an object of this invention to incorporate an allylic compound into the initial reactant charge to moderate the reaction of a hydroxyaromatic compound with an aldehyde.

It is another object of this invention to incorporate an allylic compound into a reaction mixture of thermosetting resin reactants prior to the initial heating step in order to control the rate of condensation and to retard the rate of production of cross-linked polymers.

Another object of this invention is to control the time and temperature of the "gelling" or cross-linking stage which occurs in the preparation of thermosetting resins.

The thermosetting type resins, prepared by incorporating a small but effective quantity of an allylic compound to moderate the condensation reaction and to moderate the thermosetting characteristics, are sometimes referred to as formaldehyde condensation products. These products are formed mainly from formaldehyde and phenols, a urea or an amine. The phenol formaldehyde condensates are sometimes called phenolics or phenoplasts, while the urea- and amine-formaldehyde condensates are sometimes called amino-resins or aminoplasts. In their chemical reactions in the presence of an added allylic compound, the phenoplasts and the aminoplasts are improved and stabilized.

According to the instant invention, an allylic compound has a beneficial effect on the course of the reaction and on the physical properties of the resultant polymeric product. The invention can be practiced by adding the allylic compound to formaldehyde mixtures with phenols, ureas and amines, e.g., phenol, resorcinol, the isomeric cresols, xylenols, halogenated phenols, pyrogallol, bisphenol-A, bisphenyl phenol, aniline, ureas, dicyandiamide biuret, ethylene urea, p-toluene-sulfonamide, guanidine, methylolureas, and methylol melamines.

Formaldehyde, as a typical aldehyde useful in the preparation of these resinous condensation polymers, can be employed as an aqueous solution, called Formalin, or in the form of a material which yields formaldehyde under reaction conditions, i.e., paraformaldehyde, trioxymethylene, trioxane or hexamethylenetetramine. Other aldehydes of significance in the preparation of our novel resins include the aliphatic aldehydes of 2 to about 8 carbon atoms, such as acetaldehyde, propionaldehyde, butyraldehyde, hexaldehyde, caprylic aldehyde, acrolein, crotonaldehyde, the cyclic aldehydes such as furfural, and the aromatic aldehydes such as benzaldehyde. We prefer to employ an aldehyde of 1 to 8 carbon atoms and, more specifically, a hydrocarbon carboxaldehyde of 1 to 8 carbon atoms.

In the preparation of condensation products, such as phenol-formaldehyde types, considerable exothermic heat is evolved. This heat, if allowed to evolve uncontrolled, is sufficient to cause the production of undesirable thermoset gels. The conventional method of controlling the reaction so as to minimize the formation of gels is to add formaldehyde to the reaction mixture at such a rate as to maintain a predetermined temperature by establishing a balance between the exothermic heat resulting from the added formaldehyde and environmental heat losses in the apparatus. As an alternative, it has been found possible with some formulations to blend all components in the initial phase of the cook. However, this can be accomplished only with substantial equipment modification and/or the use of inconveniently low initial cooking temperatures.

An object of the present invention is to provide a new and improved method for controlling the formation of thermoset gels in the preparation of resinous condensation products.

It has been found that the addition of an allylic compound to the components which react to form resinous condensation products, produces substantial benefits in the initial stage of cooking. One benefit immediately obtained is a moderation in the build-up of exothermic heat of reaction which allows faster addition of formaldehyde or even total addition initially and which also allows a higher initial cooking temperature without danger of gelation.

It is thus another object of the present invention to reduce exothermic heat build-up in the preparation of resinous condensation products through the addition of allylic compounds to the reacting components.

A further benefit of the allylic compound when blended in resinous condensation product reactants is the greater stability which is imparted to the condensation products.

Thus, when equivalent condensation products are prepared, some in the presence of an allylic compound and others in the absence of such compound, and when all such condensation products are standardized so as to cure at the same rate at the regular curing temperature, it is found that, for temperatures below the regular curing temperature, those products prepared in the presence of an allylic compound cross-link or gel at a slower rate than occurs for the equivalent products prepared in the absence of an allylic compound. An important consequence of this effect is that resinous condensation products may be stored at room temperature, then reheated and processed, as by blending with other resins and then, if desired, stored again at room temperature with a minimum of advancement, i.e., chain growth or cross-linking in the resin.

Accordingly, it is a further object of the present invention to enhance the stability of resinous condensation products by preparing the condensation products in the presence of an allylic compound.

Allylic compounds useful in the practice of this invention are those organic compounds containing at least one allylic linkage in the molecule. Because the allylic radical is the portion of the allylic compound which effects the aforementioned advantages, the remaining portion of the compound should be inert with respect to any other ingredient, for example, the aldehyde, which is present in the reaction mixture. This prevents any competition in the reaction mixture for the use of any moiety of the allylic compound other than the allylic radical itself. Of particular importance is the absence of any groups or radicals which will condense with the aldehyde present in the reaction mixture since such additional condensation adversely affects the control of the condensation reaction since it tends to disrupt the balance between the exothermic heat resulting from the aldehyde condensation and the environmental heat losses from the reaction apparatus. The linkage of the allyl radical to the remaining portion of the organic compound can be through an ether intermediate group, i.e., allyl n-butyl ether, allyl n-hexyl ether, allyl benzyl ether, allyl 2-hydroxyethyl ether, and the monoallyl ether of diethylene glycol. The allylic esters of organic acids are particularly suitable for this invention, including the mono-, di-, and triesters. Such esters include the monoesters of carboxylic acids and the mono- and diesters of aliphatic and aromatic dicarboxylic acids. The esters may be the monoesters of aliphatic fatty acids including the unsaturated fatty acids, the diallyl esters of dicarboxylic fatty acids, the monoallyl esters of dicarboxylic fatty acids, the isomeric diallylic dibasic aromatic acids, and the triallyl esters. Representative allylic esters include allyl propionate, allyl butyrate, allyl acrylate, allylcaproate, allyl laurate, allyl oleate, allyl stearate, diallyl maleate, diallyl fumarate, diallyl adipate, diallyl succinate, diallyl sebacate, allyl methyl adipate, allyl ethyl succinate, allyl benzoate, diallyl phthalate, diallyl isophthalate, and diallyl terephthalate.

The allylic compound can be further described as an organic compound containing at least one allylic radical in the molecule. This definition includes the allylic hydrocarbons, such as allylbenzene, and the allylic phosphates and phosphites. It is understood that certain allylic compounds are more reactive than others, and further, that differences in compatibility are brought about due to the structure of the overall molecule. In the practice of the invention, it is preferred to employ an allyl ester of an aromatic hydrocarbon dicarboxylic acid and, more specifically, one of the isomeric diallyl esters of benzene dicarboxylic acid, e.g., diallyl phthalate, diallyl isophthalate or diallyl terephthalate.

Still another object of the present invention is to provide new and improved resinous condensation products.

Other objects and advantages reside in the particular chemical constituents employed, the combination thereof, and the method of manufacture, as will become more apparent from the following description.

The present invention is applicable generally to the formation of condensation products produced by the reaction of aldehydes with urea and substituted ureas, amines such as melamine and hydroxy substituted benzene ring compounds using ratios of aldehyde to the benzene ring compound, urea or amine which are known to the art to be required for the preparation of resinous products. Beneficial effects resulting from reacting the resin components in the presence of an allylic compound are observed with both acidic and basic catalysts.

In the practice of the present invention by reacting a phenolic compound with an aldehyde, we prefer to use an aldehyde to phenol ratio in the range 1.2 to 1.8 moles aldehyde for each mole of phenol. In reacting an amine such as a melamine with an aldehyde, we prefer a ratio in the range 2 to 3 moles aldehyde for each mole of melamine and in reacting a urea with aldehyde, we prefer a ratio in the range 1.2 to 2.5 moles aldehyde for each mole of the urea.

The following are examples given to illustrate the invention:

Example I

The reaction flask was charged with 94 g., 1.0 mole, phenol and 2 g. oxalic acid. These reactants were heated to 190° F. and 243 g. of 37% aqueous formaldehyde, 3 moles, was then added to the flask at such a rate as to maintain a temperature of 200° F. in the reactor. After total addition of the formaldehyde, the mixture was refluxed 45 minutes under total reflux. The product was partially dehydrated by heating under vacuum at a temperature of 175° F. for 30 minutes and at the end of this heating period, samples were taken at periodic intervals and the gel times of these samples were checked by heating the samples at 300° F. Heating of the product was discontinued when the gel time reached 30 seconds at 300° F.

Example II

The identical procedure of Example I was repeated, except that 3.8 g., 0.015 mole, diallyl phthalate was charged to the reactor along with the initial reactants. As in the preceding example, samples were taken at intervals beginning with a time about 30 minutes after the initial application of the vacuum and the samples were checked for gel times by heating the samples at 300° F. Heating of the product was discontinued when the gel time reached 30 seconds at 300° F.

Example III

This example summarizes the comparison of the gel times for resins prepared without an added allylic ester, control run, Example I, and a run using the identical procedure but with the added allylic ester present, Example II. The following results were obtained.

| Temperature | Gel time (control run) | |
| --- | --- | --- |
| | Example I | Example II |
| 300° F | 30 seconds | 30 seconds. |
| 225° F | 5 minutes | 9 minutes. |
| 200° F | 10 minutes | 16 minutes. |
| 175° F | 19 minutes | 35 mintues. |

These measurements clearly illustrate that when the two solutions were standardized, so as to have the same gel time at 300° F., the solution containing a diallyl ester of an aromatic dibasic acid had a generally increased gel time at all temperatures below 300° F. Since the gel time is an indication of the time required for polymerization of the resin, at a given temperature, the increased gel times for the resin containing the diallyl phthalate indicate that this allylic ester has a stabilizing influence on the resin.

Example IV

A quantity of 1 mole phenol, 94 g., 3 g. sodium hydroxide, and 25 ml. distilled water was charged into a reaction flask and heated to 170° F. Aqueous 37% formaldehyde, 122 g. 1.5 moles was then added to the flask at such a rate as to maintain a temperature of 200° F. in the reactor. After total addition of the formaldehyde, the mixture was refluxed 45 minutes under total reflux. The product was partially dehydrated by heating under vacuum at a temperature of 175° F. for 30 minutes. The product was subdivided into aliquots, one of which was reserved as a control for further testing without any additive.

Example V

To an aliquot of Example IV was added 2.22 mole percent diallyl isophthalate based on phenol.

Example VI

To an aliquot of Example IV was added 3.26 mole percent diallyl isophthalate based on phenol.

Example VII

To an aliquot of Example IV was added 4.27 mole percent diallyl isophthalate based on phenol.

Example VIII

The gel time of the products of each of Examples IV, V, VI and VII was measured at 304° F. These measured gel times were plotted against the concentration of added allylic compound in mole percent in the graph of the drawing. The plotted data was observed to follow an approximate straight line identified by the reference character A in the drawing.

Example IX

A resin product was prepared according to the procedures set forth in Example IV, except that 1.66 g. 0.68 mole percent diallyl isophthalate based on phenol was charged to the reactor along with the initial reactants. As in Example IV, the product was divided into aliquots, one of which was reserved as a control for further testing without any further additive.

Example X

To an aliquot of Example IX was added 1.13 mole percent diallyl isophthalate, thereby producing a total allylic concentration in the product of 1.81 mole percent based on phenol.

Example XI

To an aliquot of Example IX was added 2.22 mole percent diallyl isophthalate, thereby producing a total concentration of allylic compound in the product of 2.90 mole percent based on phenol.

Example XII

The gel time of the products of each of Examples IX, X and XI was measured at 304° F. The measured gel times were plotted against the total concentration of the allylic compound present in each example. The plotted data were observed to produce a second straight line, identified by the reference character B in the graph of the drawing.

The straight lines A and B derived in Example VIII and XII demonstrate that the stabilizing effect resulting from an inclusion of an allylic compound in the resins produced is dramatically enhanced if an allylic compound is present when the phenol is initially reacted with the formaldehyde. Thus, in order to duplicate the stabilizing effect of 0.68 mole percent diallyl isophthalate present during the initial reaction of phenol with formaldehyde, it can be observed that an addition of diallyl isophthalate in the range of 10 mole percent would be required if the allylic compound is to be added after the initial reaction of phenol with formaldehyde. The difference in the slopes of the curves A and B also demonstrates that small increases in the concentration of allylic compound present during the initial reaction of phenol with formaldehyde have a greater stabilizing effect than correspondingly small increases in the concentration of allylic compound which take place after the initial reaction of phenol with formaldehyde.

Example XIII

The products of Examples IV, V, VI, VII, IX, X and XI were each subjected to a 24 hour water absorption test following the procedures of ASTM D570. The results of these tests are summarized in the following table.

| Example | Total allylic content (mole percent) | 24-hour moisture absorption (percent) |
|---|---|---|
| IV (control run) | 0 | 4.35 |
| V | 2.22 | 4.07 |
| VI | 3.26 | 3.10 |
| VII | 4.27 | 2.46 |
| IX | 0.68 | 2.63 |
| X | 1.81 | 2.59 |
| XI | 2.90 | 2.61 |

The foregoing results demonstrate that an allylic compound can be employed to reduce the moisture absorption of a phenolic resin both when the allylic compound is added to the prepared resin, Examples V, VI and VII, and when the allylic compound is included during the preparation of the resin, Examples IX, X and XI. However, the results further demonstrate that several times as much allylic compound must be added after the preparation in order to match the reduction in moisture absorption produced by inclusion of the allylic compound during preparation of the resin.

Example XIV

A resin product was prepared following the procedures set forth in Example IV and employed to produce a paper base laminate comprising seven plies of 10 mil paper, the laminate having a resin content of 45%. The resin in the laminate was cured at a temperature of about 300° F.

Example XV

A paper base laminate was prepared following the procedures set forth in Examples IV and XIV, with the exception that 0.7 mole percent diallyl phthalate based on phenol was included during the initial reaction of phenol with formaldehyde.

Example XVI

A paper base laminate was prepared according to the procedures set forth in Examples IV and XIV, with the exception that 2.32 mole percent diallyl phthalate based on phenol was included during the initial reaction of phenol with formaldehyde.

Example XVII

A paper base laminate was prepared according to the procedures set forth in Examples IV and XIV, with the exception that 4.62 mole percent diallyl phthalate based on phenol was included during the initial reaction of phenol with formaldehyde.

Example XVIII

The paper base laminates produced in Examples XIV, XV, XVI and XVII were subjected to testing according to ASTM D150 to measure dielectric constant and dissipation factor. The results of these tests are expressed in the following table.

| Examples | Total allylic content (mole percent) | Dielectric dissipation | |
|---|---|---|---|
| | | Constant | Factor |
| XIV (control run) | 0 | 6.15 | .089 |
| XV | 0.7 | 4.6 | .069 |
| XVI | 2.32 | 3.8 | .064 |
| XVII | 4.62 | 3.05 | .042 |

The foregoing test results demonstrate that the electrical properties of a phenolic resin product are improved by including an allylic compound during the reaction of phenol with formaldehyde. Specifically, a reduction in dielectric constant is observed, while at the same time, a reduction in dissipation factor is observed, the magnitude of the reduction being dependent upon the concentration of allylic compound present during the reaction of phenol with formaldehyde.

Example XIX

In a condensation reaction apparatus 564.0 g. (1.0 mol) phenol 18 g. sodium hydroxide and 25 ml. distilled water, were heated to 200° F. and along with 730 g. (1.5 mols) formalin (37% formaldehyde), were added from a dropping funnel through a Vigreaux column at such a rate as to maintain a temperature of 200° F. The mixture was then refluxed 45 minutes at 200° F. and a vacuum was then applied. Samples were then taken at 15 minute intervals and their viscosity measured in a Gardner tube until a viscosity of 3,700 centipoise was reached. Cooking was discontinued. The gel times of these samples were checked by heating them to 300° F. on a hot plate.

Example XX

The procedure in Example XIX was repeated, except that 22.4 gm. of diallylisophthalate was charged into the reaction apparatus along with the initial reactants.

Example XXI

This example summarizes the comparison of the gel times at various viscosities as measured on the Gardner tube for resins prepared without an added allylic ester (Example XIX) and resins prepared by the identical procedure but with the allylic ester present (Example XX). The following results were obtained.

| Example XIX | | Example XX | |
|---|---|---|---|
| Viscosity (centipoises) | Gel time (seconds) | Viscosity (centipoises) | Gel time (seconds) |
| 50 | 80 | 50 | 100 |
| 510 | 55 | 90 | 90 |
| 2,300 | 45 | 630 | 90 |
| 3,700 | 35 | 2,300 | 80 |

The results of the measurements of the gel times at 300° F. of the samples having the indicated viscosities clearly show that the use of the diallyl ester increases considerably the length of the gel times.

Example XXII

A quantity of 162 g. 1.5 moles, mixed cresols, predominately meta-, 6.5 g. sodium hydroxide and 25 ml. distilled water were charged into a reaction flask and heated to 200° F. Formalin, 170.3 g. 37% formaldehyde, was added to the flask at such a rate as to maintain a temperature of 200° F. in the flask. The mixture was then refluxed 45 minutes. The product was partially dehydrated by heating under vacuum at a temperature of 120° F. for 30 minutes. At the end of this heating period, samples were taken at intervals and gel times checked by heating the samples at 300° F. Heating of the product was discontinued when the gel time reached 30 seconds at 300° F.

Example XXIII

The identical procedure of Example XXII was repeated, except that 6.5 g. diallyl phthalate, 7.76 mole percent based on cresol, was charged to the reactor along with the initial reactants. As in the preceding example, samples were taken at intervals beginning with a time about 30 minutes after the initial application of the vacuum and the samples were checked for gel times by heating the samples at 300° F. Heating of the product was discontinued when the gel time reached 30 seconds at 300° F.

Example XXIV

This example summarizes the comparison of the gel times for cresol resins prepared without an added allylic ester, control run, Example XXII, and a run using the identical procedure but with the added allylic ester present, Example XXIII. The following results were obtained.

| Temperature | Gel time (Control run) | |
|---|---|---|
| | Example XXII | Example XXIII |
| 300° F | 30 seconds | 30 seconds |
| 270° F | 45 seconds | 70 seconds |
| 200° F | 5 minutes | 8 minutes |

These measurements clearly illustrate that when the two solutions were standardized so as to have the same gel time at 300° F., the solution containing a diallyl ester of an aromatic dibasic acid had a greatly increased gel time at all temperatures below 300° F. The increased gel times for the resin containing the diallyl phthalate indicate that this allylic ester has a stabilizing influence on the resin.

Example XXV

Amounts of 610.0 g. of cresylic acid composed of the following ingredients by weight percent—10% phenol, 17% 2,4 xylenol, 55% 3,5 xylenol, 15% 3,4 xylenol, 1% meta, paracresol, about .1% ortho cresol and about 2% higher phenol and 12.2 g. of a 50% aqueous solution of sodium hydroxide were chaged into a flask and heated to 200° F. and 575 g. of a 37% solution of formaldehyde were added to a flask from a dropping funnel at such a rate as to maintain a temperature of 200° F. in the flask. The mixture was then refluxed 45 minutes. Thereafter, a vacuum was applied to remove distillate, maintaining a temperature of 120° F. Approximately 30 minutes after application of vacuum, samples were taken at intervals and their gel times checked by heating them to 300° F. on a hot plate. Cooking was discontinued when a gel time of 90 seconds was obtained. Additional samples were then obtained and the gel times and viscosities determined after the number of days indicated in Example XXVII.

Example XXVI

The procedure in Example XXV was repeated, except that 33.0 g. of diallylphthalate was charged into the flask along with the initial reactants.

Example XXVII

This example summarizes the comparison of the gel times and viscosities for cresylic acid-formaldehyde resins prepared without and with an allylic ester in Examples XXV and XXVI, respectively. The following results were obtained.

Example XXV

300° F. hot plate gel time:
　Initial _____ sec__ 90
　53 days @ 23° C. _____ sec__ 35
Viscosity (50% soln. in cyclohexanone):
　Initial _____ cps__ 200
　30 days @ 23° C. _____ cps__ 627
　53 days @ 23° C. _____ cps__ 1760

Example XXVI

300° F. hot plate gel time:
　Initial _____ sec__ 92
　53 days @ 23° C. _____ sec__ 70
Viscosity (50% soln. in cyclohexanone):
　Initial _____ cps__ 225
　30 days @ 23° C. _____ cps__ 320
　53 days @ 23° C. _____ cps__ 550

The increased gel times and decreased viscosities after the long storage times of 30 days and 53 days at room temperature clearly indicate the improved stability of the resins containing the allyl compound.

Example XXVIII

A quantity of 32.03 g. methanol, 0.13 g. sodium carbonate 61.7 ml. distilled water was charged into a reaction flask and after mixing well the pH was adjusted to 10 using 0.1 N hydrochloric acid. With continuous agitation 2.6 moles urea, 157.9 g. were added, followed by about 5 moles formaldehyde, 163.0 g. paraformaldehyde (91%). The contents were heated to reflux temperature (198–201° F.) for 32 minutes and at this point 25% phosphoric acid was added dropwise until a pH of 5.8–6.0 was obtained. This required approximately 0.83 g. of the 25% phosphoric acid. The reaction was then allowed to reflux an additional 15 minutes and cooled to room temperature. The final pH was adjusted to 5.3–5.4 with 25% phosphoric acid.

Example XXIX

The identical procedure of Example XXVIII was repeated, except that 1.55 mole percent diallyl phthalate, 10 g., was added just prior to the addition of the urea.

Example XXX

This example summarizes a comparison of gel times for urea formaldehyde resins prepared without an added allylic ester, control run, example XXVIII and a run using the identical procedure but with added allylic ester present, Example XXIX.

| | Control run | |
|---|---|---|
| | Example XXVIII | Example XXIX |
| Gel time at 300° F | 8 seconds | 18 seconds. |
| Time to loss of fluidity at room temperature | 2 days | 4 weeks. |
| Gel time at room temperature | 7 days | 2 months. |

These measurements clearly illustrate that the reaction of urea with an aldehyde in the presence of a diallyl ester of an aromatic dibasic acid produces a resin product having a longer cure time and greater stability than an equivalent resin product prepared in the absence of an allylic compound.

Similar beneficial results are demonstrable in the reaction of melamine with an aldehyde in the presence of an allylic compound. Such reaction is accomplished by blending with a quantity of melamine an amount of formalin in the range of 2 to 3 moles formalin for each mole of melamine and a quantity of allylic compound in the range of 0.1 to 15 mole percent based on the melamine, heating the blend to reflux temperature at about 200° F. for 30 minutes and thereafter adding sodium carbonate sufficient to adjust the pH to about 8.0. This is followed by 15 minutes additional reflux and then the solution is cooled to room temperature.

A measurement of gel times for this resin in comparison with a control run prepared identically, but in the absence of an allylic compound, reveals that the melamine resin prepared in the presence of the allylic compound has a higher gel time both at room temperature and at elevated temperatures than the corresponding control run.

Additional runs were completed following the procedure of Example IV, but including in separate runs, dodecyl phenol, vinyl toluene and butyl benzyl phthalate during the reaction of phenol with formaldehyde. Gel times were measured as in Example VIII and in each of these runs no appreciable effect on gel times was observed due to the presence of the named compounds during the reaction. From the results of these tests, it is concluded that the stabilizing effect measured when compounds such as diallyl phthalate and diallyl isophthalate are employed is due to the presence of the allylic moiety.

In the manufacture of resinous condensation products, it is found that the stabilizing effect of allylic compounds appears at all concentrations. However, it is preferred to use concentrations in the range 0.1 mole percent to 15 mole percent based on the phenol, resorcinol, cresol, aniline, dicyandiamide biuret, ethylene urea, p-toluenesulfonamide, guanidine, methylolurea, or methylolmelamine. In the case of phenol formaldehyde specifically, it is preferred to use hydrocarbon phenols of 6 to 12 atoms and an allylic concentration of 0.5 mole percent to 10 mole percent based on the phenol. While the foregoing examples involve the use of diallyl phthalate or diallyl isophthalate, it is found that the beneficial effects imparted to the resin are observed when any of the allylic compounds previously listed is included in the resin during the initial reaction thereof.

The preferred time of addition of the allylic compound is to the initial reactants.

In the preceding examples, emphasis was placed upon the beneficial stabilizing effect brought about by the addition of an allylic compound to the polymer reactants. As a consequence of this beneficial effect, it has been found that higher temperatures may be used in cooking or advancing the polymer to a predetermined viscosity or brittle point. Other advantages can be related to the specific type of polymer which is being prepared. For example, when a resol is being prepared, higher mole ratios of aldehyde to phenol, or the equivalent, are possible, thus minimizing danger of gelation. The stabilizing effect also gives longer shelf life at ambient temperatures.

Although the preferred embodiments of the process have been described, it will be understood that within the purview of this invention, various changes may be made in the form, proportion and ingredients and the combination thereof, which generally stated consist in a method and a compound capable of carrying out the objects set forth, as disclosed and defined in the appended claims.

Having thus described our invention, we claim:

1. In the method of making a condensation product comprising reacting an aldehyde with a compound selected from the group consisting of phenols, amines and ureas, the improvement comprising:
    (a) adding to the said aldehyde and said compound prior to any condensation reaction therebetween, 0.1 to 15 mol percent, based on said compound, of an allylic monomer selected from the group consisting of allyl ethers, allyl esters of organic acids and allyl hydrocarbons, the allylic monomer being one which will not condense with the aldehyde present in the reaction mixture and,
    (b) reacting said aldehyde and said compound in the presence of said added allylic monomer.

2. The method of claim 1 in which the allylic monomer is selected from the group consisting of mono- and diallyl esters of a carboxylic acid.

3. The method of claim 2 in which the carboxylic acid is a dicarboxylic acid.

4. The method of claim 3 in which the dicarboxylic acid is an aromatic dicarboxylic acid.

5. The method of claim 4 in which the allylic monomer is diallyl phthalate.

6. The method of claim 4 in which the allylic monomer is diallyl isophthalate.

7. The method of claim 4 in which the allylic monomer is diallyl terephthalate.

8. The condensation product prepared by the method of claim 4.

9. The condensation product prepared by the method of claim 1.

(References on following page)

References Cited

UNITED STATES PATENTS

| | | | |
|---|---|---|---|
| 2,006,043 | 6/1935 | Dykstra | 260—4 |
| 2,442,747 | 6/1948 | Auten et al. | 260—68 |
| 2,647,882 | 8/1953 | Evans et al. | 260—47 |
| 2,668,802 | 2/1954 | Evans et al. | 260—33.4 |
| 2,985,614 | 5/1961 | Bright | 260—43 |
| 2,813,844 | 11/1957 | Werner et al. | 260—45.2 |
| 3,291,770 | 12/1966 | Gaylord et al. | 260—33.4 |

OTHER REFERENCES

Walker, Formaldehyde, 1964, pp. 269, 346–347, 352–353, 391 and 416–421.

WILLIAM H. SHORT, *Primary Examiner.*

H. SCHAIN, *Assistant Examiner.*

U.S. Cl. X.R.

260—51, 72, 53, 69, 54, 45.85, 55, 59, 67.6, 70; 161—263; 260—56, 264